Dec. 27, 1960 J. Z. YOUNG ET AL 2,966,299

APPARATUS FOR COUNTING A NUMBER OF REGIONS IN A SCANNING FIELD

Filed March 29, 1955 3 Sheets-Sheet 1

INVENTOR
John Z. Young
Wilfred K. Taylor
David J. Causley
BY Holcombe, Wetherill & Brisebois
ATTORNEY Dec. 27, 1960 — J. Z. YOUNG ET AL — 2,966,299

APPARATUS FOR COUNTING A NUMBER OF REGIONS IN A SCANNING FIELD

Filed March 29, 1955 — 3 Sheets-Sheet 2

INVENTOR
John Z. Young
Wilfred K. Taylor
David J. Causley
BY Holcombe, Wetherill & Brisebois
ATTORNEY INVENTOR
John Z. Young
Wilfred K. Taylor
David J. Causley
BY Holcomb, Wetherill & Brisebois
ATTORNEY United States Patent Office 2,966,299

Patented Dec. 27, 1960

2,966,299

APPARATUS FOR COUNTING A NUMBER OF REGIONS IN A SCANNING FIELD

John Zachary Young, 24 Park Village East, NW. 1, London, England; Wilfred Kenelm Taylor, 29 Draycott Place, London, England; and David James Causley, 10A Albert Road, Ilford, Essex, England Filed Mar. 29, 1955, Ser. No. 497,736

Claims priority, application Great Britain Apr. 6, 1954

10 Claims. (Cl. 235—92)

This invention relates to apparatus for counting the number of regions of a scanning field occupied by a condition whose extent in the direction of scanning exceeds a fixed amount. By varying the fixed amount in discrete steps and making a count at each value of the fixed amount, it is possible to assess the magnitude distribution among the total number of occurrences of the condition.

The condition occupying the regions to be counted may be the presence of microscopic particles in, an image projected onto, the scanning field and the apparatus of the invention is especially suitable for application to the counting of such particles. The method of scanning in this case may comprise projecting a beam of light through the field, and causing the beam to traverse the field in a normal television type raster, so that the beam impinges on a photoelectric cell from which an output is generated.

The field being scanned may be scanned in a normal television type raster, i.e., moving the scanning means relatively to the field from left to right and displacing the scanning means vertically between the scanning of adjacent lines until the whole field has been scanned. If the method is to be used for counting microscopic particles then the width of the scanning line may be no greater than the width of the smallest spot of light that can be derived from a cathode ray tube, and in general, the width of the line should be as great as the minimum dimension in a direction normal to the direction of the line, of the regions which are to be counted when the fixed amount is the minimum. The scanning path may alternatively be in the form of a spiral originating from the centre of the field being scanned. As a still further alternative the field may be the curved surface of a cylinder which rotates and the scanning means may be made to move in a vertical direction.

Apparatus for carrying out the invention may comprise means for scanning the field by a line-scanning method, means for producing as a result of the scanning, two out-put signals, of which one is derived from the scanning of a first line of the field and the other is derived from the scanning of a second line adjacent to said first line, each out-put signal being such that each region, or part of a region, intersecting the scanning line from which the signal is derived and having an extent in the direction of scanning greater than a fixed amount is represented in the signal, the representation being such that the positions of the trailing ends of the representations are determined by the trailing ends of the corresponding regions in the scanning line and that the durations of the representations are determined by the extent by which the condition exceeds the fixed amount, and means for comparing the two signals and counting the number of occasions on which a representation in one of the signals does not coincide with any part of a representation in the other signal.

The apparatus may be such that only one line of the field is scanned at a time and a delay device is incorporated in the apparatus so that an out-put signal derived from scanning one line of the field may be delayed or stored for comparison with the signal derived from scanning the next adjacent line. Alternatively, the two lines may be scanned simultaneously.

By way of example the application of the apparatus of the invention to the counting of discrete microscopic particles will now be described with reference to the accompanying drawings, in which.

Two beams of light are passed through the field of view of the particles and are moved simultaneously to scan the field in a normal television type raster. Each beam falls, after passing through the field as a spot on to a photoelectric cell and each cell produces an intermediate output signal comprising pulses the durations of which are determined by the lengths of time during which light is prevented by particles from falling upon the cell and whose positions in the intermediate output signal are determined by the positions of the particles in the scanning line. Suitable apparatus, in which the beams of light are provided by passing one beam of light from a cathode ray tube through a bi-refringant crystal is described in co-pending application No. 336,182, filed February 10, 1953, now Patent No. 2,927,219, but any other suitable apparatus may be used.

Figure 1:
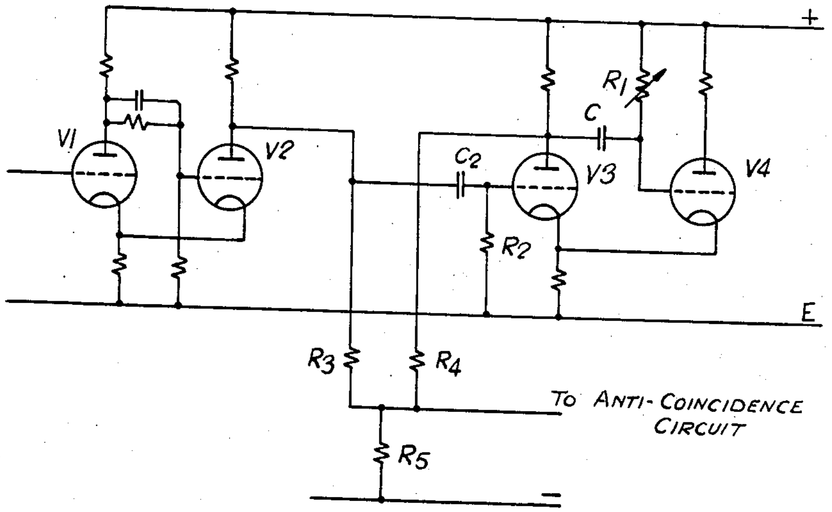
Fig. 1 shows a circuit the input to which is constituted by the waveform derived from a photoelectric cell onto which a beam of light passing through the field containing the particles falls, the output of the circuit representing the number of pulses in the input waveform which are derived from particles having a dimension in the direction of scanning greater than a predetermined minimum.

The intermediate output signals from the respective photoelectric cells are passed through similar circuit arrangements. One of these circuits is shown in Fig. 1 and will be described in detail.

The photoelectric cell is so arranged that a positive pulse occurs in the intermediate signal whilst the beam of light normally incident upon the cell is intercepted by a particle in the field of view. The signal is applied to a squaring circuit, which is shown in Fig. 1 as a Schmitt trigger circuit incorporating valves $V_1$ and $V_2$. The positive pulses are squared by the squaring circuit and the squared pulses are simultaneously applied to the resistance $R_3$ and passed through a differentiating circuit $C_2R_2$. The leading and trailing differentiated pulses derived from the differentiating circuit are applied in turn to a flip-flop multi-vibrator circuit incorporating valves $V_3$ and $V_4$. The application of the leading differentiated pulse causes a negative pulse which may be called a comparison pulse to be generated by the flip-flop circuit and the pulse is applied to the resistance $R_4$. The natural duration of the comparison pulse is determined by the values of $R_1$ and C and it would normally persist until this period has elapsed. If, however, the trailing differentiated pulse is applied to the flip-flop circuit before the expiration of this period the effect of the trailing differentiated pulse will be to curtail the negative comparison pulse.

Preferably the positive and negative pulses are arranged to be of equal amplitudes. In this case, the application of the positive and negative pulses to the resistances $R_3$ and $R_4$, respectively, will produce a change of potential across $R_5$ if, and only if, the positive pulse is of longer duration than the negative. (The positive pulse cannot be shorter than the negative pulse since the separation between the differentiated pulses is equal to the duration of the positive pulse and the second differentiated pulse curtails the negative pulse if its natural duration is greater than that of the positive pulse.) Any change of potential across $R_5$ will be in the form of a positive pulse whose duration is equal to the difference between the positive and negative pulses applied to $R_3$ and $R_4$. The out-put signal, which is to be compared with a similar signal derived from the next adjacent scanning line, is obtained from the potential developed across $R_5$ and only the pulses remaining across $R_5$ after the cessation of the negative pulse applied to $R_4$ are used for counting as described later.

It is preferred to arrange that the amplitudes of the positive and negative pulses applied to $R_5$ are equal to each other so that no potential change appears across $R_5$ unless the positive pulse is of the longer duration. If, however, the pulses are of different amplitudes, it can be arranged that the apparatus to which the pulses appearing across $R_5$ are passed is sensitive to the change in the amplitude of the signal applied across $R_5$ which occurs when the negative pulse ceases before the positive.

By varying $R_1$ and C the natural duration of the negative comparison pulse can be varied and in this way a count can be made of all the particles which cause positive pulses to be emitted having a duration greater than a variable standard duration.

Figure 2:
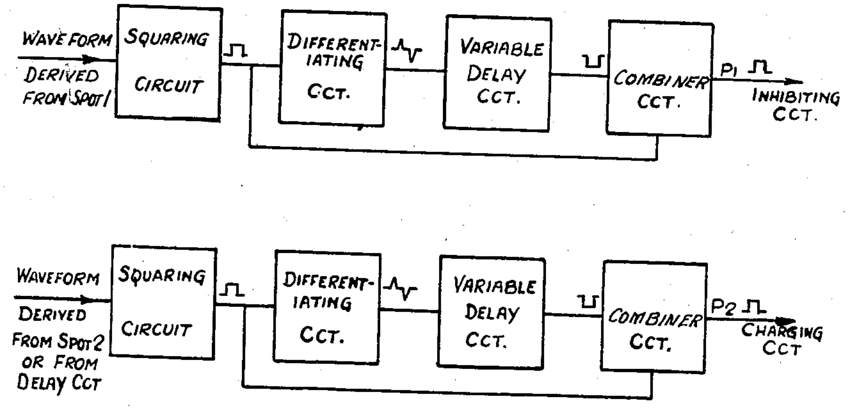
Fig. 2 is a block diagram representing the circuit shown in Fig. 1.

A generalized block diagram of the apparatus shown in Fig. 1 is shown in Fig. 2. It should be noted that the pulses applied to $R_3$ and $R_4$ are added together so that the combiner block in Fig. 2 represents $R_3$, $R_4$ and $R_5$ in Fig. 1, in conjunction with the effect of the flip-flop circuit. Fig. 2 also shows, in block form, the two circuits, associated one with each scanning spot, and indicates how the circuits are connected to the anti-coincidence circuit to be described later.

Figure 3:
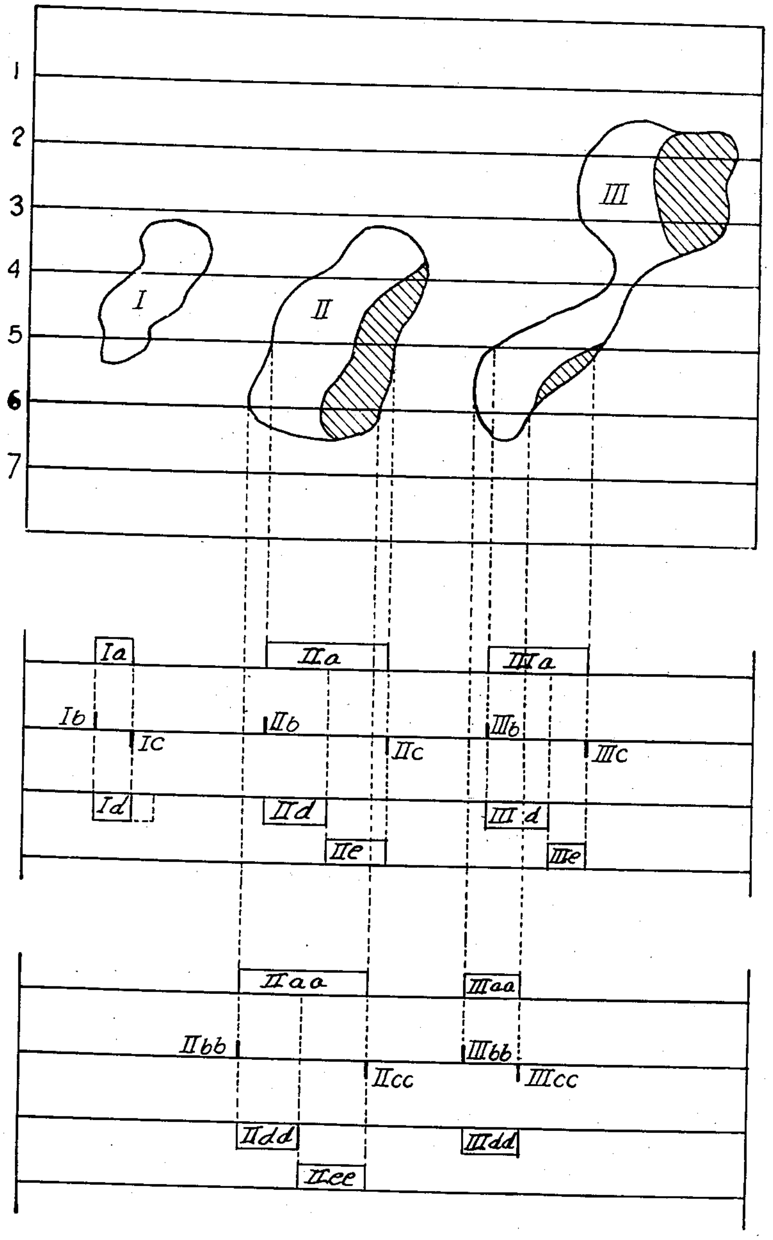
Fig. 3 shows three particles in a field of view and illustrates the pulses derived from the interception of a beam by a particle.

The potentials produced in and by the apparatus so far described during the scanning of a field of view will be more readily understood from the following description with reference to Fig. 3.

This figure shows three particles in the field of view. Consider a scanning spot travelling along the path indicated by the line 5 and consider the interception of the spot by the particle II. The presence of the particle will prevent the spot from falling on the photoelectric cell and this will initiate a positive pulse which, after passage through the squaring circuit will appear as the condition pulse II*a*. This pulse will be applied to the combiner, Fig. 2, and also be differentiated as indicated at II*b* and II*c*. The leading differentiated pulse II*b* will generate the negative comparison pulse II*d* whose natural duration is determined by the values of $R_1$ and C (Fig. 1) and is shown as being less than that of the pulse II*a*. The comparison pulse is also applied to the combiner from which the resultant pulse II*e* will emerge and this output or residual pulse II*e* will be the representation in the out-put signal of the particle II.

The pulses produced by the passage of the spot along path 5 across the particle I is such that no resultant residual pulse emerges from the combiner since the differentiated pulse I*c* causes the premature extinction of the comparison pulse I*d*. The positive and negative pulses therefore cancel each other completely so that the particle I is not represented in the out-put signal.

The apparatus has so far been described with reference to a single beam of light. Two beams are, however, moved in synchronism across the field of view. The scanning spots which the beams produce are of the same size and their centres are separated in a direction normal to their direction of motion by a distance equal to the diameter of the spots. Each beam falls onto a corresponding photoelectric cell and the intermediate output signals produced from each cell are passed through circuits as described and the signals from the respective combiner circuits are passed to an anti-coincidence counting circuit which is arranged to register a count of one if a residual pulse occurs in the output signal derived from the combiner associated with one beam due to the interception of the beam by a particle but no residual pulse occurs in the output signal derived from the combiner associated with the other beam. This will occur when the width of particle traversed by one of the beams is greater than that represented by the length of the negative comparison pulse and if the particle does not extend into the path traversed by the other beam, or, if the particle does so extend, if the width of the part that does extend is not greater than that represented by the duration of the negative comparison pulse.

Referring to Fig. 3 of the drawings, no count would be obtained by beams travelling simultaneously along the lines 5 and 6 on passing particle II since a residual pulse is obtained from the two combiners associated one with each of the two beams. A count would, however, be obtained on scanning particle III since a residual pulse would be derived from the passage of a beam past the particle along the line 5 but not from the passage of the other beam past the particle along line 6.

The anti-coincidence circuit can be arranged to detect each time that either of the beams is intercepted by a particle of greater than the minimum width whilst the other is not (in this case the total count must be divided by a factor of two to give the total number of particles) or it may detect only when either the upper or the lower beam is traversing such a particle whilst the other is not. An anti-coincidence circuit for detecting when a residual pulse occurs in the output signal from the combiner associated with the lower beam but not in the output signal from the combiner associated with the upper beam i.e., for counting the upper edge of the particles will now be described with reference to Figs. 4 and 5.

Figure 4:
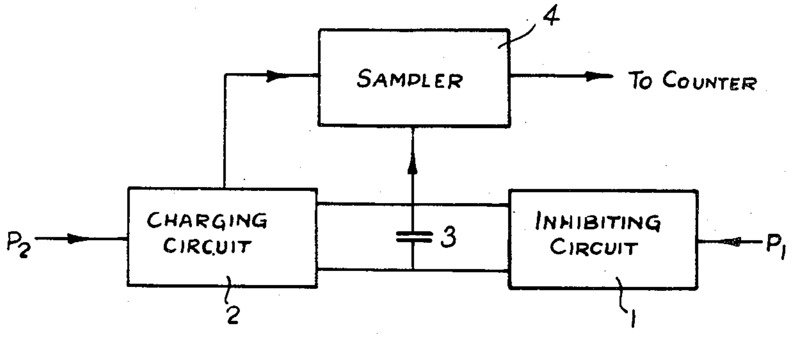
Fig. 4 is a block diagram of an anti-coincidence circuit.

The residual pulses *p*1 and *p*2 in the output signals from the combiners associated one with each of the beams are inverted and applied respectively as negative pulses to the input of an inhibiting circuit 1 and a charging circuit 2, Fig. 4. A memory condenser 3 is connected to the output side of both the circuits 1 and 2 and also to a sampling circuit 4 which on its input side is connected to the charging circuit 2 and on its output side to a counter not shown.

The memory condenser 3 is charged via the circuit 2 by a pulse derived from the leading edge of the pulse *p*2 and the charge is sampled by a further pulse derived from the lagging edge of that pulse as will be described in greater detail with reference to Figure 5. The condenser charge is removed by a pulse derived from pulse *p*1 via the inhibiting circuit 1. If there is coinncidence between the pulses *p*1 and *p*2 i.e., if *p*1 commences before *p*2 has wholly ceased the condenser charge is removed before it can be sampled and no output from the sampling circuit to the counter is obtained. If, however, there is no such coincidence, there will be an output from the sampling circuit to the counter and it is for this reason that the arrangement shown in Figures 4 and 5 may conveniently be referred to as an anti-coincidence circuit.

Figure 5:
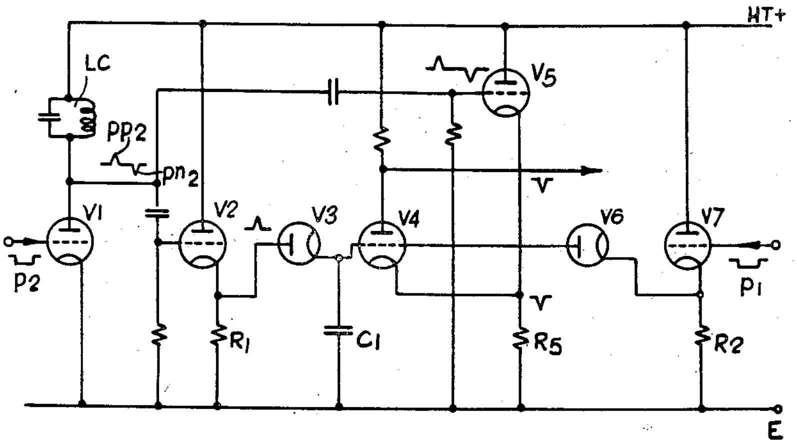
Fig. 5 is a detailed diagram of an anti-coincidence circuit.

The anti-coincidence circuit is shown in greater detail in Figure 5 in which the valves $V_1$, $V_2$ and diode $V_3$, with their associated components, constitute the charging circuit 2 of Figure 4, the valves $V_4$, $V_5$ and diode $V_6$ with their components constitute the sampling circuit 4 and the valve $V_7$ constitutes the inhibiting circuit.

Anode current normally flows through valve $V_1$, the anode load of which includes an inductance/capacitor combination LC, the effect of the load being to produce high constant amplitude output pulses of constant width for all input pulses above a predetermined amplitude, this kind of circuit being known as a peaking circuit. The application of the negative residual pulse *p*2 to the control grid of valve $V_1$ produces across the anode load a positive pulse $pp2$ at the leading edge, followed by a negative or sampling pulse $pn2$ at the lagging edge. The pulse $pp2$ is fed through the resistance/capacity coupling shown to the control grid of valve $V_2$, which is of the cathode follower type, to charge a memory condenser $C_1$ (corresponding to condenser 3 of Figure 4) through a cathode resistance $R_1$ and the diode $V_3$, the condenser being charged to approximately peak value. The charge on condenser $C_1$ is applied to the control grid of valve $V_4$ and is maintained on that grid for a period which is long, compared with the width of the input pulse, because the grid bias of $V_7$ is made positive so that the diodes $V_3$ and $V_6$ are non-conducting when $C_1$ is charged and pulses $pn_2$ and $p_1$ are not present.

The valve $V_5$ normally carries a heavy current and the voltage drop across a resistance $R_5$ in its cathode lead provides sufficient positive bias on the cathode of the valve $V_4$ to maintain this valve normally non-conducting. The anode of valve $V_1$ is resistance/capacity coupled to the control grid of valve $V_5$ and on arrival of the negative pulse $pn2$ at the control grid the anode current of valve $V_5$ is cut off, so removing the positive bias on the cathode of valve $V_4$. The charge on condenser $C_1$ then becomes effective to cause valve $V_4$ to conduct and an output pulse is produced which is fed to a counter circuit, not shown, connected to the anode of valve $V_4$, thus registering a count of "one."

If, however, the pulse $p1$, coincides with some part of pulse $p2$, the application of this coincident pulse to the control grid of valve $V_7$, which is of the cathode follower type, causes the diode $V_6$ to conduct and as the diode anode is connected to the control grid of valve $V_4$ a conductive path to earth is provided via resistance $R_2$, for the charge on condenser $C_1$ which is thus discharged before the sampling pulse $pn2$ is applied to valve $V_5$. Thus no output is obtained from valve $V_4$ and no count is registered.

In the case of irregular particles such as that illustrated at III in Fig. 3 in which two parts of the particle are joined by a narrow waist portion, the method described may not produce a wholly accurate count of the number of particles because the width of the waist portion may be such that it is less than the width corresponding to the comparison pulse so that an anti-coincidence will be counted for the part lying above the waist portion and for the part lying below it. Such particles will therefore be counted as two particles when the minimum width of the particles to be counted is greater than the width of the waist portion. Each count will, of course, represent a region whose extent is greater than the fixed amount.

By increasing or decreasing the duration of the comparison pulse after each successive scanning of the field, the number of particles in the field having a dimension in the direction of scanning which lies between prescribed values can be assessed. The field of view can be rotated so that a similar assessment can be made for the dimensions of the particles in a different direction of scanning. In this way an estimate of the size distribution of the particles can be evolved.

The field of view need not be scanned by the normal television type raster but may for instance be scanned in a spiral path originating from the centre of the field of view. Moreover it is not necessary that two beams should be used. For instance, one beam may be used and the waveform emitted from one photoelectric cell when the beam scans the field of view, along a horizontal line or one turn of a spiral, can be stored and compared with the waveform produced when the beam traverses the next adjacent line or turn of the spiral. A convenient method of storing the waveform is to record the waveform on a magnetic tape and reproduce the recording after a time equal to the time taken by the beam in moving from a point on one horizontal line or turn of the spiral to the corresponding point in the next adjacent horizontal line or turn of the spiral. The tape may be in the form of a loop on which signals are continuously recorded and erased.

We claim:

1. Apparatus for counting the number of regions of a scanning field occupied by a condition whose extent in the direction of scanning exceeds a fixed amount comprising means for line-scanning the field; generating means co-operating with the scanning means to produce for each of two adjacent lines a signal in which the position and duration of any region or part of a region lying in the scanning line is represented by a condition pulse; two pulse discriminating circuits each for producing a comparison pulse of a duration representing the said fixed amount and for producing a signal in which each condition pulse having a duration greater than that of the comparison pulse is represented by a residual pulse having its leading edge in coincidence with the trailing edge of the comparison pulse and a duration corresponding to the amount by which the duration of the condition pulse exceeds that of the comparison pulse; means for applying the signals containing the condition pulses from the generating means one to each of the pulse discriminating circuits; an anti-coincidence circuit; means for applying simultaneously the signals from the pulse discriminating circuits to the anti-coincidence circuit; and a counter for counting when a condition pulse in the signals from one pulse discriminating circuit does not coincide with any part of a condition pulse in the signal from the other pulse discriminating circuit.

2. Apparatus for counting the number of regions of a scanning field occupied by a condition whose extent in the direction of scanning exceeds a fixed amount comprising means for line-scanning the field; generating means co-operating with the scanning means to produce for each of two adjacent lines a signal in which the position and duration of each region or part of a region lying in the scanning line is represented by a square condition pulse of the same amplitude as the other condition pulses in the signal; two pulse discriminating circuits each comprising means for generating, at the instigation of a condition pulse in a signal from the generating means, a square comparison pulse whose duration represents the minimum extent in the direction of scanning of any region that is to be counted and whose polarity is opposite to the polarity of the condition pulses in the signal from the generating means; two combiner circuits; means for applying the comparison pulse and the condition pulse, simultaneously, with their leading ends coinciding, from each of the discriminating circuits to a respective one of the combiner circuits to produce a square residual pulse output from each combiner circuit; an anti-coincidence circuit; means for applying the outputs from the two combiner circuits simultaneously to the anti-coincidence circuit; and a counter for counting the number of occasions on which a square residual pulse from one of the combiner circuits does not coincide with any part of a square residual pulse from the other of the combiner circuits.

3. Apparatus for counting the number of regions of a scanning field occupied by a condition whose extent in the direction of scanning exceeds a fixed amount comprising means for scanning the field so that each of two adjacent lines of the field are scanned simultaneously; two signal producing means co-operating with the scanning means so that, simultaneously with the other, each produces, for one of the two adjacent lines, an output signal in which the position and duration of each region or part of a region in the scanning line is represented by a condition pulse; two pulse discriminating circuits, means for applying the output signals from the signal producing means to a respective one of the discriminating circuits each of which generates a signal in which every condition pulse in a signal applied to the circuit and whose duration is greater than that of a comparison pulse, whose duration represents the minimum extent in the direction of scanning of any region that is to be counted, is represented by a residual pulse such that the position of its trailing end corresponds to the position of the trailing end of the corresponding condition pulse and its duration represents the amount by which the condition pulse exceeds the comparison pulse; an anti-coincidence circuit, means for applying simultaneously the signals from the pulse discriminating circuits to the anti-coincidence circuit; and a counter for counting when a residual pulse in the signal from one of the pulse discriminating circuit does not coincide with any part of a residual pulse in the signal from the other pulse discriminating circuit.

4. Apparatus for counting the number of regions of a scanning field occupied by a condition whose extent in the direction of scanning exceeds a fixed amount comprising means for scanning the field so that each of two adjacent lines of the field are scanned simultaneously; two signal producing means co-operating with the scanning means so that, simultaneously with the other, each produces, for one of the two adjacent lines, a signal in which the position and duration of each region or part of a region lying in the scanned line is represented by a square condition pulse of the same amplitude as the other condition pulses in the signal; two pulse discriminating circuits each comprising means for generating, at the instigation of a condition pulse in a signal from the signal producing means, a comparison square pulse whose duration represents the minimum extent in the direction of scanning of any region that is to be counted and whose polarity is opposite to the polarity of the condition pulses in the signal from the signal-producing means; two combiner circuits; means for applying the comparison pulse and the condition pulse, simultaneously, with their leading ends coinciding, from each of the discriminating circuits to a respective one of the combiner circuits to produce a square residual pulse; an anti-coincidence circuit; means for applying the outputs from the two combiner circuits simultaneously to the anti-coincidence circuit; and a counter for counting the number of occasions on which a square residual pulse from one of the combiner circuits does not coincide with any part of a square residual pulse from the other of the combiner circuits.

5. Apparatus as claimed in claim 4 in which the means for scanning the field is so controlled that after two lines have been scanned simultaneously, one of the lines is re-scanned, by the means that previously scanned the other line, simultaneously with the scanning of a fresh line by the other means and so on until the whole field has been scanned.

6. Apparatus for counting the number of regions of a scanning field occupied by a condition whose extent in the direction of scanning exceeds a fixed amount comprising means for line-scanning the field; translation means for producing for each of two adjacent lines of the field a signal in which the extent by which any of the regions or parts of a region lying in the scanning line exceed the fixed amount is represented by a residual pulse, the position of whose trailing end corresponds to the trailing end of the corresponding region in the scanning line and whose duration represents the amount by which the extent of the region exceeds the fixed amount; an anti-coincidence circuit comprising a sampling circuit, a memory condenser, a charging circuit connected to said condenser and said sampling circuit and an inhibiting circuit, means for applying the signal derived from one of the lines of the field to the charging circuit for charging said condenser and simultaneously applying an alerting signal to the sampling circuit when the leading end of a residual pulse of the signal derived from said one line is applied to the charging circuit and for sending a releasing signal to the sampling circuit when the trailing end of the said residual pulse is applied to the charging circuit, means for applying the signal derived from the other line to the inhibiting circuit for discharging the condenser when the leading end of a residual pulse of the signal derived from said other line is applied to the inhibiting circuit; and counting means for registering a count of one each time a releasing signal is applied to the sampling circuit before the condenser is discharged.

7. Apparatus as claimed in claim 6 in which the translation means produces signals having negative residual pulses and the charging circuit includes a valve having an output lead and a peaking circuit in the output lead for producing a positive peaked pulse when the leading end of a residual pulse is applied to the charging circuit and a negative peaked pulse when the trailing end of said pulse is applied; and means whereby the production of a positive peaked pulse charges the memory condenser; the sampling circuit comprises a first normally non-conducting valve having a grid to which the memory condenser is connected, and a normally conducting valve biassing the said first valve to the non-conducting condition, the first normally non-conducting valve and the normally conducting valve being interconnected so that the application of a negative peaked pulse to the normally conducting valve renders the first normally non-conducting valve conducting to connect the memory condenser to the counting means to be discharged thereby through the said first normally non-conducting valve; and the inhibiting circuit comprises a second normally conducting valve interconnected with the first normally non-conducting valve so that the application of a residual pulse to the second normally conducting valve establishes a connection between the grid of the first normally non-conducting valve and earth thereby to discharge the memory condenser to earth.

8. Apparatus for counting the number of particles in a scanning field whose width in the direction of scanning exceeds a fixed amount comprising means for producing two beams of light for line-scanning the field, means for moving the beams so that the whole field is eventually scanned; two photoelectric devices associated one with each of the beams; signal-producing means in which the photoelectric devices are incorporated which each produce a signal in which the position and duration of the interception of the corresponding beam by a particle is represented by a condition pulse; two pulse discriminating circuits, each for producing a signal in which every input pulse in a signal applied to the circuit and whose duration is greater than that of a comparison pulse, whose duration represents the minimum extent of any particle that is to be counted, is represented by a residual pulse such that the position of its trailing end corresponds to the position of the trailing end of the corresponding input pulse and its duration represents the amount by which the input pulse exceeds the comparison pulse; means for applying the signals, containing the condition pulses which act as the input pulses, from the signal-producing means one to each of the pulse discriminating circuits; an anti-coincidence circuit, means for applying simultaneously the signals from the pulse discriminating circuits to the anti-coincidence circuit; and a counter for counting when a residual pulse in the signal from one of the pulse discriminating circuits does not coincide with any part of a residual pulse in the signal from the other pulse discriminating circuit.

9. Apparatus for counting the number of particles in a scanning field whose width in the direction of scanning exceeds a fixed amount comprising means for producing two beams of light for line-scanning the field, means for moving the beams so that the whole field is eventually scanned; two photoelectric devices associated one with each of the beams; signal-producing means in which the photoelectric devices are incorporated which produces for each beam a signal in which the position and duration of the interception of the corresponding beam by a particle is represented by a square condition pulse of the same amplitude as the other condition pulses in the signal; two pulse discriminating circuits each comprising means for generating, at the instigation of a condition pulse in a signal from the signal-producing means, a comparison square pulse whose duration represents the minimum extent in the direction of scanning of any particle that is to be counted and whose polarity is opposite to the polarity of the condition pulses in the signal from the signal-producing means; two combiner circuits; means for applying the comparison pulse and the condition pulse, simultaneously, with their leading ends coinciding, from each of the discriminating circuits to a respective one of the combiner circuits to produce a square residual pulse; an anti-coincidence circuit; means for applying the outputs from the two combiner circuits simultaneously to the anti-coincidence circuit; and a counter for counting the number of occasions on which a square residual pulse from one of the combiner circuits does not coincide with any part of a square residual pulse from the other of the combiner circuits.

10. Apparatus as claimed in claim 9 in which the means for moving the two beams is such that after two adjacent lines have been scanned simultaneously one of the lines is re-scanned, by the beam that previously scanned the other line, simultaneously with the scanning of a fresh line by the other beam and so on until the whole field has been scanned.

References Cited in the file of this patent

UNITED STATES PATENTS

| | | |
|---|---|---|
| 2,616,983 | Zworkin | Nov. 4, 1952 |
| 2,661,902 | Wolff et al. | Dec. 8, 1953 |
| 2,791,377 | Dell et al. | May 7, 1957 |

OTHER REFERENCES

"Nuclear Radiation Physics" (Lapp and Andrews), published by Prentice Hall Inc. (New York), 1952 (pages 225–227 relied on).

"Automatic Counting of Microscopic Particles" by F. Roberts in "Nature," vol. 169, pages 518–520, March 29, 1952.